(12) United States Patent
Simons

(10) Patent No.: US 7,976,731 B2
(45) Date of Patent: Jul. 12, 2011

(54) METAL COMPLEXES FOR ENHANCED DISPERSION OF NANOMATERIALS, COMPOSITIONS AND METHODS THEREFOR

(75) Inventor: Richard S. Simons, Akron, OH (US)

(73) Assignee: Maverick Corporation, Blue Ash, OH (US)

( * ) Notice: Subject to any disclaimer, the term of this patent is extended or adjusted under 35 U.S.C. 154(b) by 299 days.

(21) Appl. No.: 12/150,163

(22) Filed: Apr. 25, 2008

(65) Prior Publication Data

US 2010/0065786 A1    Mar. 18, 2010

Related U.S. Application Data

(63) Continuation-in-part of application No. PCT/US2006/040802, filed on Oct. 20, 2006.

(60) Provisional application No. 60/730,098, filed on Oct. 26, 2005, provisional application No. 61/010,453, filed on Jan. 9, 2008.

(51) Int. Cl.
   *H01B 1/06* (2006.01)
(52) U.S. Cl. ......... 252/506; 210/688; 524/847; 525/416
(58) Field of Classification Search .................. 252/506; 210/688; 429/40; 524/847; 525/416
   See application file for complete search history.

(56) References Cited

U.S. PATENT DOCUMENTS

| 7,238,288 | B1 * | 7/2007 | Gao et al. ................. | 210/688 |
| 2003/0143453 | A1 * | 7/2003 | Ren et al. ................. | 429/40 |
| 2004/0034177 | A1 * | 2/2004 | Chen ................. | 525/416 |
| 2007/0004857 | A1 * | 1/2007 | Barraza et al. ................. | 524/847 |
| 2010/0065786 | A1 * | 3/2010 | Simons ................. | 252/506 |

FOREIGN PATENT DOCUMENTS

| FR | 2859988 | * | 3/2005 |
| KR | 10-0652861 | * | 4/2006 |
| WO | WO/2007/050408 | | 5/2007 |
| WO | WO 2007/139244 | | 12/2007 |

OTHER PUBLICATIONS

Akisada et al., "Interaction between polymer and bivalent metal alkyl sulfates," Menoirs of the Faculty of Science, 1978, 10(3), pp. 189-199.*
Bahadur et al., "IR characterization of metal dodecyl sulfates and their solubilizing action," Chem. Lab., 1985, 22 (4), 196-200.*
Chemical abstract, 1 page, Ref. No. XP-002530821, Author: Akisada, Hideo, Kuroki, Yuzo, Koga, Keiko, Moroi, Yoshikiyo, Matuura, Ryohei, 1978.
Chemical abstract, 1 page, Ref. No. XP-002530822, Author: Bahadur, P.; Gupta, A.; Khatri, A.; 1985.
European Search Report, 5 pages; Application No. EP 09 15 5925, Jun. 5, 2009.
Synthesis and characterization of carbon nanotube/metal nanoparticle composites well dispersed in organic media. Vassilios Tzitzios, et al. Apr. 20, 2005 (6 pages).
Dispersing of Ag, Pd, and Pt-Ru alloy nanoparticles on single-walled carbon nanotubes by y-irratiation Seong-Dae Oh, et al., Aug. 5, 2004 (4 pages).
Preparation of Pt nanoparticles on carbon nanotubes and graphite nanofibers via self-regulated reduction of surfactants and their application as electrochemical catalyst. Chien-Liang Lee, et al., (6 pages), Jan. 26, 2005.

* cited by examiner

*Primary Examiner* — Mark Kopec
*Assistant Examiner* — Khanh Tuan Nguyen
(74) *Attorney, Agent, or Firm* — Renner, Kenner, Greive, Bobak Taylor & Weber

(57) ABSTRACT

Metal complexes ("compatibilizers") having properties particularly useful for treating and compatibilizing nanomaterials (i.e. carbon nanotubes, nanofibers, nanographite) include metal cations and anionic surfactants. The treated nanomaterials can be isolated as solid treated nanomaterial and used in further applications where increased dispersion is desirable.

14 Claims, No Drawings

METAL COMPLEXES FOR ENHANCED DISPERSION OF NANOMATERIALS, COMPOSITIONS AND METHODS THEREFOR

CROSS REFERENCE TO RELATED APPLICATIONS

This application is a continuation-in-part of PCT Application No. PCT/US2006/040802, filed Oct. 20, 2006, which claims the benefit of U.S. Provisional Application No. 60/730,098 filed Oct. 26, 2005. This application also claims the benefit of U.S. Provisional Application No. 61/010,453, filed Jan. 9, 2008. The disclosures of each of these applications are hereby incorporated by reference.

FIELD OF THE INVENTION

The present invention relates generally to the compatibilization of nanomaterials to various matrix materials as well as to related compositions and methods therefor. The present invention relates more specifically to metal complexes, herein also termed "compatibilizers," that non-covalently bond/adsorb onto the surface of nanomaterials, such as carbon nanotubes, to yield a treated nanomaterial that can easily be dispersed into a solvent-based matrix material such as a protic solvent. From there, the solvated matrix material can be either further dispersed, or dried and further dispersed, with or without other materials, into other matrix materials, such as, for example, monomers, oligomers and/or polymers, thereby producing a composite material that has enhanced mechanical, thermal and electrical properties. The composites may have end-use applications in the aerospace, automotive, biomedical, textile, and electronic fields.

BACKGROUND OF THE INVENTION

Applications for carbon nanotubes are enormous due to their mechanical, thermal, and electronic properties. Incorporation and dispersion of carbon nanotubes into polymers have proven difficult due to the inherent bundling of the carbon nanotube due to van der waal forces and incompatability at the polymer/nanotube (NT) interface.

Pristine nanotubes are generally insoluble/incompatible in common solvents, oligomers and polymers. Such nanotubes are also difficult to chemically functionalize without altering the desirable intrinsic properties of nanotubes. Single-walled nanotubes (SWNTs) have been solubilized/dispersed in organic solvents and water by polymer wrapping (Dalton et al., (J. Phys. Chem. B (2000) 104, 10012); Star et al. (Angew. Chem., Int. Ed. (2001) 40, 1721), and O'Connell et al. (Chem. Phys. Lett. (2001) 342, 265)), and non-covalently functionalized by adhesion of small molecules for protein immobilization (Chen et al., (J. Am. Chem. Soc. 123:3838 (2001))). The polymer wrapping approach works poorly for dissolution of small diameter SWNTs possibly due to unfavorable polymer conformations.

One known process for non-covalent functionalization and for dispersion of carbon nanotubes is described by Chen, J. et al. (J. Am. Chem. Soc., 124, 9034 (2002)), incorporated herein by reference. The process results in nanotube dispersion using a non-wrapping approach. Specifically, SWNTs were solubilized in chloroform with poly(phenylene ethynylene)s (PPE) along with vigorous shaking and/or short bath-sonication as described by Chen et al. (ibid) and in U.S. Patent Publication No. U.S. 2004/0034177 published Feb. 19, 2004, and U.S. patent application Ser. No. 10/318,730.

The chemistry of arene-silver(I) complexes is well established. Many examples exist in the literature to demonstrate the ability of Ag(I) to coordinate to polyaromatic systems in a $\pi$-bonding fashion (see, for example, Megumu et. al., Coordination Chemistry Reviews 2000, 198, 171-203).

Further, the use and development of certain types of metal complexes based upon an organic material being coordinate-bonded to the metal cation is more fully described in PCT Publication No. WO 2007/139244.

The development of metal complexes for compatibilizing nanomaterials, related compositions, and methods therefore, is on-going, and at least one more development is provided herein.

SUMMARY OF THE INVENTION

One of the present embodiments of the invention provides a metal complex dispersed on the surface of a nanomaterial, the metal complex comprising a metal cation capable of being adsorbed onto a surface of the nanomaterial; and a surfactant anion selected from the group of compatible surfactant anions and incompatible surfactant anions, with the proviso that if an incompatible surfactant anion is used, the metal complex further includes at least one neutral donor ligand attached to the metal cation which is capable of stabilizing the metal complex and stabilizing any interactions between the metal complex and the nanomaterial, and with the proviso that if a compatible surfactant anion is used, then the metal complex is devoid of any neutral donor ligands attached to the metal cation. By the terms "compatible" and "incompatible," it is meant that the tail, as described herein, on the surfactant anion either matches (i.e. is compatible with) the hydrophobicity or hydrophilicity of the matrix into or onto which the nanomaterial will be used or does not match (i.e., is incompatible with) the hydrophobicity or hydrophilicity of the matrix.

The present invention further provides a nanocomposite comprising a matrix; and a nanomaterial treated with a metal complex and dispersed in the matrix. The metal complex contains a metal cation capable of being adsorbed onto a surface of the nanomaterial; and a surfactant anion selected from the group consisting of (i) surfactant anions compatible with the matrix and capable of stabilizing the metal complex and stabilizing any interactions between the metal complex and the nanomaterial, and between the metal complex and the matrix, and (ii) surfactant anions incompatible with the matrix, with the proviso that if an incompatible surfactant anion is used, the metal complex further includes at least one neutral donor ligand attached to the metal cation which is capable of stabilizing the metal complex and stabilizing any interactions between the metal complex and the nanomaterial and between the metal complex and the matrix, and with the proviso that if a compatible surfactant anion is used, then the metal complex is devoid of any neutral donor ligands attached to the metal cation.

Still further, the present invention provides a method for making a nanocomposite comprising a matrix and a nanomaterial, wherein the nanomaterial is compatible with the matrix upon treatment thereof, the method comprising the steps of treating the nanomaterial with a metal complex, the metal complex containing a metal cation, a surfactant anion, and at least one neutral donor ligand, wherein the metal cation is adsorbed onto a surface of the nanomaterial, wherein the surfactant anion is compatible with the matrix, and wherein the neutral donor ligand is attached to the metal cation and stabilizes the metal complex and stabilize any interactions between the metal complex and the nanomaterial, and between the metal complex and the matrix; and dispersing the treated nanomaterial into the matrix.

The advantages of the present invention over existing prior art relating to the compatibilization of nanomaterials, such as, for example, carbon nanotubes, with matrix materials, such as, for example, solvents, monomers, polymers, and the like, which shall become apparent from the description which follows, are accomplished by the invention as hereinafter described and claimed.

DESCRIPTION OF ONE OR MORE EMBODIMENTS OF THE INVENTION

As noted hereinabove, at least one embodiment of the present invention provides for a metal complex having properties that are particularly useful and suitable for compatibilizing nanomaterials with a matrix material such that, upon subsequent dispersion of the nanomaterials into the matrix material, a useful nanocomposite is provided that can be used as an useful article or as a precursor to improving another article.

In at least one embodiment, the metal complex includes a metal cation capable of being adsorbed onto a surface of the nanomaterial and a surfactant anion compatible with the matrix. Notably, unlike some metal complexes, these metal complexes do not include a neutral donor ligand attached to the metal cation. The metal complex can be made by any technique known in the art, but must have at least one functional group capable of compatibilizing the nanomaterial. This means that at least one unit of the metal complex is a substituent capable of interacting with another chemical group to form a covalent or non-covalent bond. Similarly, in another embodiment, the metal complex must also have a substituent or functional group capable being compatible with the matrix material. In one embodiment of the present invention, the metal cation is preferably the substituent that is capable of interacting with the nanomaterial while the anionic surfactant is the substituent that is capable of interacting with the matrix. In one embodiment, the anionic surfactant is inorganic. In another embodiment, the anionic surfactant is organic.

In at least another embodiment, the metal complex includes a metal cation capable of being adsorbed onto a surface of the nanomaterial; a surfactant anion compatible with the matrix; and at least one neutral donor ligand attached to the metal cation. The metal complex can be made by any technique known in the art, but must have at least one functional group capable of compatibilizing the nanomaterial. This means that at least one unit of the metal complex is a substituent capable of interacting with another chemical group to form a covalent or non-covalent bond. Similarly, in another embodiment, the metal complex must also have a substituent or functional group capable being compatible with the matrix material. In one embodiment of the present invention, the metal cation is preferably the substituent that is capable of interacting with the nanomaterial while the anionic surfactant (and/or neutral donor ligand) is the substituent that is capable of interacting with the matrix.

Thus, it will be understood that, if the surfactant anion is compatible with the matrix, then the metal complex will be devoid of any neutral donor ligands. However, if the surfactant anion is incompatible with the matrix, then a neutral donor ligand should be included in the metal complex. Again, to determine whether or not the surfactant anion is compatible with the matrix, a determination of the matrix must be pre-selected. For instance, if the matrix is an aqueous solvent, then one may wish to employ a surfactant anion that has a hydrophilic tail, in which instance the surfactant anion would be compatible with the matrix. On the other hand, if the same surfactant anion were used, but the nanomaterial was to be put into an organic solvent, then the surfactant anion would be incompatible with the matrix. Nevertheless, if the surfactant anion was changed to include a hydrophobic tail, then surfactant anion would be compatible with the matrix, i.e., the organic solvent. Thus, the issue of compatibility is pre-determined based upon whether the hydrophobicity or hydrophilicity of the surfactant anion is the same or different from the hydrophobicity or hydrophilicity of the matrix to be employed.

The metal cation can be any metal cation known to be useful for the purposes of the present invention. That is, essential any non-radioactive metal capable of being non-covalently bonded or adsorbed onto the surface of a desired nanomaterial can be used. Such metal cations may include any of the alkali metals, alkaline earth metals, or the transition metals from groups 4-12 of the transition series of the periodic table.

In one embodiment, the metal cation is silver. Silver complexes have properties that are believed to be particularly useful for compatibilizing certain types of nanomaterials, such as carbon nanotubes, and for effecting subsequent dispersion of a solid nanomaterial within a matrix material such as a solvent or polymer. In addition, the use of silver cations can be useful because silver complexes are known to have anti-microbial properties associated with them. In another embodiment, the metal cation is copper.

Essentially any anionic surfactant compatible with the matrix material can be used in the present invention. More particularly, it will be appreciated that such an anionic surfactant may include any inorganic and organic anionic species that would balance the charge of the metal cation selected and be useful to the present invention. The anionic surfactant may be a mono-anion, an oligomeric anion, or a polyanion.

In at least one embodiment of the present invention, the inorganic surfactant anion can be any molecular moiety useful as a counteranion and capable of acting as a compatibilizer between the desired nanomaterial and the desired matrix material. Such anions may include, but are not limited to, a moiety selected from the group of nitrate, triflate, sulfate, sulfonate, phosphate, silicate and carboxylate. These anionic surfactants work particularly well with silver cations in the formation of metal complexes, such as silver(I) silicates for example, that are believed to be excellent compatibilizers of carbon nanomaterials as discussed hereinbelow. One particularly useful metal complex is silver silicate, wherein the metal cation is silver and the inorganic surfactant anion is a silicate or montmorillonite, such as present in various types of inorganic mineral clays. In another embodiment, another particularly useful metal complex is silver alkyl sulfate, wherein the metal cation is silver and the surfactant anion is, for example, dodecyl sulfate.

The surfactant anion has a surfactant tail. Such a tail may be organic or inorganic in nature, and may be hydrophobic or hydrophilic in nature. Such a tail may be a long tail, defined as having 10 atoms or more in its backbone chain, or a short tail, defined as having less than 10 atoms in its chain. It will be appreciated that the longer the chain forming the surfactant tail, the easier the surfactant tail can debundle the nanomaterial, such as nanotubes, that may be held together by van der waal's forces and the like, and the easier it can prevent the re-aggregation of the nanomaterial. Of course, such a surfactant tail also aids in the ability of the metal complex to act as a compatibilizer between the desired nanomaterial and the desired matrix material.

The surfactant tail may be linear, branched or cyclic. Where suitable, the surfactant tail of the anionic surfactant may include from 1 to about 100 carbon atoms. As such, the surfactant tail may contain an organic functional moiety selected from the group consisting of aromatic, alkyl, olefinic, allyl, ether, amide, carboxylic, carbonate, and combinations and mixtures thereof. Such organic tails may be useful for compatibilizing those nanomaterials and those matrix materials that, while not necessarily compatible with each other, are compatible with the metal complexes of the present invention having such organic functional moieties.

In another embodiment, the surfactant anion may employ a surfactant tail comprising from 1 to about 100 inorganic atoms. As such, the surfactant tail may contain a functional moiety selected from the group consisting of silanes, siloxanes, germanes, germoxanes, stannanes, stannoxanes, phosphanes, phophenes, arsanes, arsenes, and combinations and mixtures thereof. Of course, inorganic tails such as these may also be suitable for compatibilizing those nanomaterials and those matrix materials that, while not necessarily compatible with each other, are compatible with the metal complexes of the present invention having such inorganic functional moieties.

In the present invention, it will be appreciated that it is the metal cation that attaches to or bonds to the nanomaterial, and the inorganic surfactant anion that is compatible with the matrix material into which the nanomaterial treated with the metal complex of the present invention will be mixed. In the prior art, it is often the anionic species of a metal complex that is bonded to the nanomaterial, thereby preventing the use of an inorganic anionic surfactant to act as the compatibilizer between the nanomaterial and the matrix material into which it is mixed.

Furthermore, it will be appreciated that, in one embodiment of the present invention, the surfactant anion comprises a plurality of anionic compounds, thereby forming polyanionic compounds. In this embodiment, it is understood that one polyanionic strand will interact with several metal cations to yield a large portion of the nanomaterial compatible with a large portion of the matrix material.

As noted earlier, the present invention differs from many metal complexes useful for enhancing dispersion of nanomaterials in a matrix in that the metal complexes of the present invention are devoid of a neutral donor ligand. A "neutral donor ligand" may be defined as a monofunctional or multifunctional (i.e., has one or more functional groups) compound attached to the metal cation; hence the use of the word "ligand." As described below, other embodiments of the metal complexes of the present invention may require neutral donor ligands that are capable of stabilizing the metal complex, or capable of stabilizing any interactions between the metal complex and the nanomaterial or any interactions between the metal complex and the matrix material. In this embodiment of the present invention, the surfactant anion is capable of providing these stabilities.

As earlier described, if the surfactant anion is incompatible with the matrix, then the metal complex may also include at least one neutral donor ligand. Each neutral donor ligand is monofunctional or multifunctional, meaning is has one or more functional groups capable of bonding to the metal cation. Each neutral donor ligand in the present invention is attached to the metal cation; hence the use of the word "ligand." Each neutral donor ligand should be capable of stabilizing the metal complex. Moreover, one or more the these ligands should also be capable of stabilizing any interactions between the metal complex and the nanomaterial or any interactions between the metal complex and the matrix material.

Essentially any neutral donor ligand that can act as a donor ligand toward the metal cation, and provide favorable interaction with the nanomaterial and/or the matrix material, would be suitable for the present invention. Some select neutral donor ligands include but are not necessarily limited to phosphate ester, phosphine, amine, or pyridine. In one embodiment, at least one of the neutral donor ligands contains a functional group that favors compatibility with solvents, monomer, oligomers, polymers, elastomers, thermosets and thermoplastics.

In one embodiment of the present invention, a metal complex may employ at least one bifunctional neutral donor ligand. Such a bifunctional neutral donor ligand may be a bipyridine such as 4,4-bipyridine.

It will be appreciated that each neutral donor ligand may be the same or different from every other neutral donor ligand that may be provided as a part of the metal complex. In one embodiment of the present invention, the metal complex may use at least one neutral donor ligand that is bifunctional, such as bipyridine, and at least a second neutral donor ligand that is the same or different than the first donor ligand. In other words, the second neutral donor ligand may be a bipyridine or may be some other ligand, such as a phosphate ester, a phosphine, an amine, or some other pyridine.

In view of the foregoing, a metal complex of the present invention that employs a surfactant anion compatible with the matrix may be depicted schematically as shown in Formula I below:

$$M\text{-}W \qquad (I)$$

wherein M is a metal cation and W is an inorganic surfactant anion. Again, the present invention is devoid of any neutral donor ligands.

In one embodiment, the metal complex may be a silver complex. One example of a silver complex suitable for use in the present invention is shown in Formula (II) below.

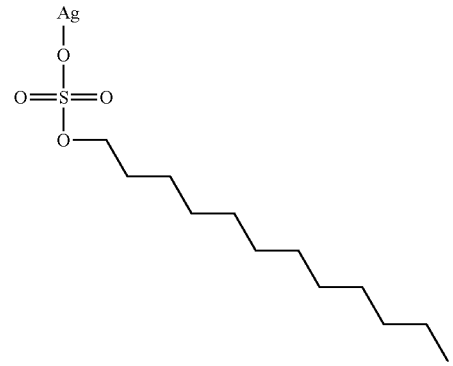

(II)

In another embodiment of the present invention, a metal complex of the present invention may be depicted schematically as shown in Formula III below:

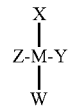

(III)

wherein M is a metal cation, W is a surfactant anion, and X, Y, and Z are additional ligands, namely neutral donor ligands.

In one embodiment, the metal complex may be a silver complex. One example of a silver complex suitable for use in the present invention is shown in Formula (IV) below.

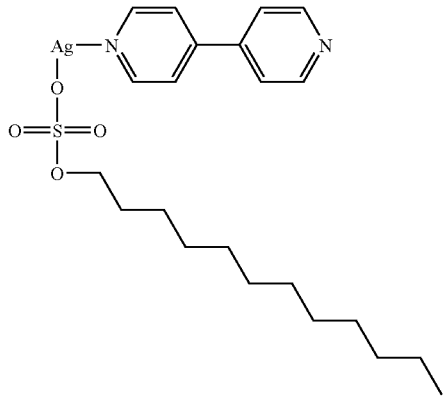

(IV)

It will be appreciated that any of a wide variety of neutral donor ligands can be used in conjunction with the metal complexes of the present invention. Some examples of neutral donor ligands are shown below as Formulas (V), (VI) and (VII):

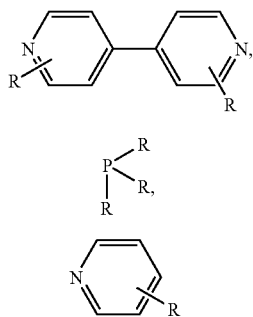

(V)

(VI)

(VII)

Wherein the Rs are intended to depict moieties that are useful to compatibilize and for favorable interactions that will promote good dispersion and good load transfer between the nanomaterial and the matrix material.

Yet another embodiment of the present invention provides a metal complex for use as a coating for a surface of a nanomaterial. The coating comprises a metal complex containing a metal cation capable of being adsorbed onto the surface of the nanomaterial and an anionic surfactant attached to the metal cation. If the anionic surfactant is compatible with the matrix to be used with the nanomaterial, then the anion surfactant will be capable of stabilizing the metal complex and stabilizing any interactions between the metal complex and the nanomaterial and between the metal complex and the matrix. On the other hand, if the anionic surfactant is incompatible with the matrix to be used with the nanomaterial, then the metal complex will further include at least one neutral donor ligand attached to the metal cation and capable of stabilizing the metal complex and stabilizing any interactions between the metal complex and the nanomaterial and between the metal complex and the matrix.

The term "nanomaterial," as used herein, includes, but is not limited to, carbon nanotubes (including multi-wall carbon nanotubes and single-wall carbon nanotubes), carbon nanoparticles, carbon nanofibers, carbon nanoropes, carbon nanoribbons, carbon nanofibrils, carbon nanoneedles, carbon nanosheets, carbon nanorods, carbon nanohoms, carbon nanocones, carbon nanoscrolls, graphite nanoplatelets, graphite nanoparticles, nanodots, other fullerene materials, or a combination thereof. The term, "multi-wall," is meant to include double-wall nanotubes (DWNTs) and few-wall nanotubes (FWNTs). In one embodiment the nanomaterials are made from carbon, given that the present invention is generally directed to a method of dispersing carbon-based nanomaterials into matrix materials with which such nanomaterials typically are not compatible.

The term "nanotubes" may be used broadly herein in some instances and, unless otherwise qualified or more strictly identified, is intended not to be limited to its technical definition. In a technical sense, a "nanotube" is a tubular, strand-like structure that has a circumference on the atomic scale. However, it will be understood that other nanomaterials would work with the present invention.

A method for making metal complexes of the present invention comprises reacting the metal salt with the inorganic anionic surfactant. For example, the reaction of silver nitrate with sodium dodecyl sulfate yields the silver(I) dodecyl sulfate complex. Upon completion of that reaction or during it, equal molar portions of other substitutents, to be used as the neutral donor ligands, can be added. For example, the addition of equal molar portions of 4,4-bipyridine yields the silver(I)-4,4-bipyridine dodecyl sulfate complex. In another example, the reaction of silver nitrate with an inorganic clay, such as sodium silicate, yields a silver silicate complex. Notably, no neutral donor ligands are added to the reaction or to the complex after completion of this reaction.

Upon forming the metal complex, it may be used to treat any of a number of different types of nanomaterials, including particularly, nanotubes. In one embodiment, the nanomaterial may be "treated" by mixing it with the metal complex, typically in a solvent to form a solution. Any method of mixing the nanomaterial and the metal complex known in the art may be used in the present invention. The term "mixing," as used herein, means that the nanomaterial and the metal complex are brought into contact with each other in the presence of the solvent. "Mixing" may include simply vigorous shaking, or may include sonication for a period of time of about 10 min. to about 30 min.

A solvent may be used to disperse the nanomaterial and incorporate and treat the nanomaterial with the metal complex. The solvent may be organic or aqueous such as, for example, $CHCl_3$, chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, chlorobenzene, chloroform, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethylbenzene, ethylene glycol ethers, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, N-methyl-2-pyrrolidone, methyl ethyl ketone, dioxane, or dimethyl sulfoxide. In certain embodiments of the present invention, the solubilization solvent is a protic solvent and, in at least one embodiment, the solubilization solvent is water. In other embodiments, the solubilization solvent is a halogenated organic solvent and, in at least one embodiment, the solubilization solvent is chlorobenzene.

Of note, upon treatment of the nanomaterial with the metal complex, an interaction occurs between the metal complex and nanomaterial. The interaction is a noncovalent bonding instead of covalent bonding. Therefore, the underlying electronic structure of the nanomaterial and its key attributes are not affected.

In one embodiment, the nanomaterial is treated with a metal salt such as, for example, silver nitrate ($AgNO_3$) in an aqueous solution. Generally, the silver nitrate is compatible with the nanomaterial, but not with the aqueous solvent, or vice versa, is compatible with the aqueous solvent, but not with the nanomaterial. Thus, by replacing the nitrate anions with an anion that will increase the compatibility between the nanomaterial and the aqueous solvent, the nanomaterial becomes "treated," meaning the resultant metal complex will be compatible and stable with both the nanomaterial and the solvent or matrix material. In one embodiment, an inorganic surfactant anion compound, such as an inorganic clay like sodium silicate (montmorillonite), may be used to exchange the anion from a nitrate to a silicate, which has been found to be more compatible to the treatment of the nanomaterial and the aqueous solution.

Typically, treating the nanomaterials comprises the step of coating the metal complex onto a surface of the nanomaterial by any manner known in the art. Upon treatment, the treated nanomaterial can be used for a variety of purposes as described hereinbelow.

In one embodiment of the present invention, treated nanomaterial may comprise an amount of metal complex by weight ratio of greater than zero and less than 1.0. The weight ratio is calculated as the weight of the coated nanomaterials minus the weight of uncoated nanomaterials divided by the weight of the uncoated nanomaterials. In the present invention it is preferable that the ratio is in the range of 20-30 wt %.

In yet another embodiment of the present invention, the treated nanomaterials dispersed in solvent may not settle out even over a period of weeks. The treated nanomaterials can be isolated by filtering onto filter paper.

In another embodiment of the present invention, solid coated nanomaterial may be obtained from solution by removing the solvent. That is, solid coated nanomaterial can be obtained from the solutions of coated nanomaterial as described above by removing the solvent by one of many standard procedures well known to those of ordinary skill in the art. Such standard procedures include drying by evaporation such as by evaporation under vacuum or evaporation with heat, casting, precipitation or filtration and the like. A solvent for precipitating solid coated nanomaterials has a polarity that is opposite in the polarity of the metal complexes. For material obtained by methods of the present invention, the solid coated nanomaterial is generally black in color with a uniform network of carbon nanotubes. Solid coated nanomaterial may be pulverized to produce a powder.

As an example of making treated nanomaterials, a silver complex as described above, e.g., the silver(I) silicate complex, may be dispersed with carbon nanotubes in a solvent such as water. It will be appreciated that the silver silicate may be originally another silver-based salt, such as silver nitrate for the initial dispersion. The silver cation is absorbed onto the surface of the nanomaterial and the silicate, provided as, for example, sodium montmorillonite, is exchanged with the nitrate in an ion exchange process within the treatment solution. The silver complexes attach (non-covalently bond) to the surface of the carbon nanotubes, but do not affect their electrical conductivity abilities. The result of this mixing yields carbon nanotubes coated with the silver based complex. The coated nanomaterial can be isolated as a dispersion of the coated nanomaterial in a solvent or it may be isolated as a solid coated nanomaterial. Such coated nanomaterials can then be easily be dispersed in solvents, monomers, oligomers, polymers, various hydrocarbon and/or inorganic matrices or the like, as described hereinbelow.

As another example of making a treated nanomaterial, a silver complex as described above, i.e., the silver(I)-4,4-bipyridine dodecyl sulfate complex, may be dispersed with carbon nanotubes in a solvent such as chlorobenzene. The silver complexes attach (non-covalently bond) to the surface of the carbon nanotubes, but do not affect their electrical conductivity abilities. Moreover, in some embodiments, because the metal complexes may have long chain anionic surfactant tails, the ability of the nanotubes to re-aggregate is disrupted. The result of this mixing yields carbon nanotubes coated with the silver complex. The coated nanomaterial can be isolated as a dispersion of the coated nanomaterial in a solvent or it may be isolated as a solid coated nanomaterial. Such coated nanomaterials can then be easily be dispersed in solvents, monomers, oligomers, polymers, various hydrocarbon and/or inorganic matrices or the like, as described hereinbelow.

Upon forming the treated nanomaterials, these nanomaterials may then be dispersed in a matrix material to form nanocomposites. That is, a nanocomposite comprises a matrix; and a nanomaterial treated with a metal complex and dispersed in the matrix. The metal complex has been previously described.

The terms "matrix" and "matrix material" are used interchangeably herein. Any matrix material desired may be used in the present invention, provided the metal complex selected provides for desirable and favorable interactions between the nanomaterial and the matrix material. Matrix material may include, but is not necessarily limited to solvents (including the solvent used in treating the nanomaterial), monomers, polymers, elastomers, thermoplastics, thermosets or any combinations or mixtures thereof. In one embodiment, the matrix is a solvent or a polymer. Where a solvent is used, such a solvent may be selected from the group consisting of water, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, methyl ethyl ketone, dioxane, acetic acid, acetone, acetonitrile, aniline, benzene, benzonitrile, benzyl alcohol, bromobenzene, bromoform, 1-butanol, 2-butanol, carbon disulfide, carbon tetrachloride, chlorobenzene, chloroform, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethylbenzene, ethylene glycol ethers, ethylene glycol, ethylene oxide, formaldehyde, formic acid, glycerol, heptane, hexane, iodobenzene, mesitylene, or dimethyl sulfoxide. In one embodiment, the solvent is a protic solvent. In a further embodiment, the solvent is an aqueous solvent.

Where a polymer is used, it may be selected from inorganic or organic polymers. Inorganic polymers may include, but are not limited to, polysiloxanes, polysilanes, polygermanes, polystannanes, polyphosphazenes, and combinations thereof. Organic polymers may include, but are not limited to, polyolefins (PO), polyamides (nylons), polystyrenes (PS), ethylene-vinyl acetate copolymers (EVA), polyimides, polyurethanes (PU), poly(ethylene terephthalate) (PET), polyvinyl chloride (PVC), polystyrenes (PS), poly(ethylene-co-vinyl acetate) (PEVA), epoxies, polyanilines, polythiophenes, cyanate esters, polycarbonates, and copolymers, terpolymers, and mixtures thereof. In one embodiment, organic polymers selected from the group consisting of polystyrenes, polycarbonates, epoxies and polyurethanes are preferred. In another embodiment, organic polymers selected from the group consisting of polyesters, polyamides, and polyimides are preferred. In yet another embodiment, the preferred matrix material may be oligomers selected from the group consisting of polyols and prepolymers.

In a further embodiment of the invention, the nanomaterial may be dispersed into the matrix material with other additives or materials. Such other materials may add desired properties beyond those added to the matrix material by the dispersion of the nanomaterial. Such additives include, but are not necessarily limited to, other silicates, clays, ceramics, plasticizers, metal oxides, other nanomaterials, and other carbon based materials such as carbon black or graphite, or combinations of these. Upon the addition of these other additives, other nanocomposites may be possible. Where ceramics are used, such ceramics may include, but are not necessarily limited to alumina, zirconia, carbides, nitrides, borides, silicides and combinations thereof.

A further embodiment of the present invention comprises a method for making a nanocomposite comprising a matrix and a nanomaterial, wherein the nanomaterial is compatible with the matrix upon treatment thereof. The method comprises treating the nanomaterial with a metal complex, the metal complex having been previously described. Other additives may then be added to the treated nanomaterial, if desired, and then the treated nanomaterial is dispersed into a matrix.

As described above, treating a nanomaterial may comprise coating the metal complex onto a surface of the nanomaterial. There are several ways in which to disperse the nanomaterial into the matrix.

For example one way to disperse the treated nanomaterial in the matrix is to melt the matrix and mix the nanomaterial into the melted matrix. This is known as melt compounding. Alternatively, the treated nanomaterial may be dispersed by solvating the matrix in one of the solvents described above and mixing the nanomaterial into the solvated matrix. Still further, the treated nanomaterial may be dispersed by mixing the nanomaterial into a monomer of the matrix and polymerizing the matrix. All of these methods are generally known in the art for mixing/dispersing compounds.

Another method for making a nanocomposite comprising a matrix and a nanomaterial includes the steps of coating the metal complex onto a surface of the nanomaterial and dispersing the nanomaterial in the matrix to make a masterbatch of the resultant nanocomposite. Then, additional nanomaterials may be dispersed into the masterbatch.

Yet a further embodiment for making a nanocomposite is to provide a masterbatch of the resultant nanocomposite as described above and then to further disperse the masterbatch into another matrix. In this manner, it will be appreciated that new articles and compositions can be made that include the nanocomposites of the present invention having nanomaterials dispersed therein that have been coated with metal complexes of the present invention that enable the nanomaterial to be compatible with the matrix material into which they are dispersed.

Another embodiment of the present invention relates to the dispersion of coated nanomaterial. Solid coated nanomaterial obtained as described above is dispersed by mixing the solid coated nanomaterial with a matrix such as a solvent, oligomer and/or polymer. For dispersions of coated nanomaterials in solvents the term "mixing," as used herein for dispersion, means that the solid coated nanomaterial and the solvent are brought into contact with each other. "Mixing" for dispersion may include simply vigorous shaking, or may include sonication for a period of time of about 10 min to about 30 min.

The dispersion solvent may be the same solvent as the solvent used in the coating process or may be a different solvent. Accordingly, the solvent may be organic, protic, or aqueous such as, for example, $CHCl_3$, chlorobenzene, water, acetic acid, acetone, acetonitrile, aniline, benzene, benzonitrile, benzyl alcohol, bromobenzene, bromoform, 1-butanol, 2-butanol, carbon disulfide, carbon tetrachloride, chlorobenzene, chloroform, cyclohexane, cyclohexanol, decalin, dibromethane, diethylene glycol, diethylene glycol ethers, diethyl ether, diglyme, dimethoxymethane, N,N-dimethylformamide, ethanol, ethylamine, ethylbenzene, ethylene glycol ethers, ethylene glycol, ethylene oxide, formaldehyde, formic acid, glycerol, heptane, hexane, iodobenzene, mesitylene, methanol, methoxybenzene, methylamine, methylene bromide, methylene chloride, methylpyridine, morpholine, naphthalene, nitrobenzene, nitromethane, octane, pentane, pentyl alcohol, phenol, 1-propanol, 2-propanol, pyridine, pyrrole, pyrrolidine, quinoline, 1,1,2,2-tetrachloroethane, tetrachloroethylene, tetrahydrofuran, tetrahydropyran, tetralin, tetramethylethylenediamine, thiophene, toluene, 1,2,4-trichlorobenzene, 1,1,1-trichloroethane, 1,1,2-trichloroethane, trichloroethylene, triethylamine, triethylene glycol dimethyl ether, 1,3,5-trimethylbenzene, m-xylene, o-xylene, p-xylene, 1,2-dichlorobenzene, 1,3-dichlorobenzene, 1,4-dichlorobenzene, 1,2-dichloroethane, N-methyl-2-pyrrolidone, methyl ethyl ketone, dioxane, or dimethyl sulfoxide. In certain embodiments of the present invention, the solvent may be a halogenated organic solvent such as 1,1,2,2-tetrachloroethane, chlorobenzene, chloroform, methylene chloride, or 1,2-dichloroethane. In other embodiments, the solvent may be a protic solvent and, in at least one embodiment, the solvent is water.

Another embodiment of the present invention relates to coated nanomaterial as provided herein dispersed within a host matrix. The host matrix may be a host polymer matrix or a host non-polymer matrix.

The term "host polymer matrix," as used herein, means a polymer matrix within which the coated nanomaterial is dispersed. A host polymer matrix may be an organic polymer matrix or an inorganic polymer matrix, or a combination thereof. Examples of a host polymer matrix include polyamide (nylon), polyethylene, epoxy resin, polyisoprene, sbs rubber, polydicyclopentadiene, polytetrafluoroethulene, poly(phenylene sulfide), poly(phenylene oxide), silicone, polyketone, aramid, cellulose, polyimide, rayon, poly(methyl methacrylate), poly(vinylidene chloride), poly(vinylidene fluoride), carbon fiber, polyurethane, polycarbonate, polyisobutylene, polychloroprene, polybutadiene, polypropylene, poly(vinyl chloride), poly(ether sulfone), poly(vinyl acetate), polystyrene, polyester, polyvinylpyrrolidone, polycyanoacrylate, polyacrylonitrile, polyamide, poly(arylene-ethynylene), poly(phenyleneethynylene), polythiophene, thermoplastic, thermoplastic polyester resin (such as polyethylene terephthalate), thermoset resin (e.g., thermosetting polyester resin or an epoxy resin), polyaniline, polypyrrole, or polyphenylene or a combination thereof.

Further examples of a host polymer matrix include a thermoplastic, such as ethylene vinyl alcohol, a fluoroplastic such as polytetrafluoroethylene, fluoroethylene propylene, perfluoroalkoxyalkane, chlorotrifluoroethylene, ethylene chlorotrifluoroethylene, or ethylene tetrafluoroethylene, ionomer, polyacrylate, polybutadiene, polybutylene, polyethylene, polyethylenechlorinates, polymethylpentene, polypropylene, polystyrene, polyvinylchloride, polyvinylidene chloride, polyamide, polyamide-imide, polyaryletherketone, polycarbonate, polyketone, polyester, polyetheretherketone, polyetherimide, polyethersulfone, polyimide, polyphenylene oxide, polyphenylene sulfide, polyphthalamide, polysulfone, or polyurethane. In certain embodiments, the host polymer may include a thermoset, such as allyl resin, melamine formaldehyde, phenol-fomaldehyde plastic, polyester, polyimide, epoxy, polyurethane, or a combination thereof.

Examples of inorganic host polymers include a silicone, polysilane, polycarbosilane, polygermane, polystannane, a polyphosphazene, polysilicates, or a combination thereof.

More than one host matrix may be present in a nanocomposite. By using more than one host matrix, mechanical, thermal, chemical, or electrical properties of a single host matrix nanocomposite are optimized by adding coated nanomaterial to the matrix of the nanocomposite material.

In one embodiment, using two host polymers is designed for solvent cast epoxy nanocomposites where the coated nanomaterial, the epoxy resin and hardener, and the polycarbonate are dissolved in solvents and the nanocomposite film is formed by solution casting or spin coating.

In a further embodiment of the invention, the coated nanomaterial of the nanocomposite may be a primary filler. In this case, the nanocomposite may further comprise a secondary filler to form a multifunctional nanocomposite. In this embodiment, the secondary filler comprises a continuous fiber, a discontinuous fiber, a nanoparticle, a microparticle, a macroparticle, or a combination thereof. In another embodiment, the treated nanomaterial of the nanocomposite is a secondary filler and the continuous fiber, discontinuous fiber, nanoparticle, microparticle, macroparticle, or combination thereof, is a primary filler.

It will be understood that the nanocomposites themselves can be used as a host matrix for a secondary filler to form a multifunctional nanocomposite. Examples of a secondary filler include: continuous fibers (such as carbon fibers, carbon nanotube fibers, carbon black (various grades), carbon rods, carbon nanotube nanocomposite fibers such as nylon fibers, glass fibers, nanoparticles (such as metallic particles, polymeric particles, ceramic particles, nanoclays, diamond particles, or a combination thereof, for example), and microparticles (such as metallic particles, polymeric particles, ceramic particles, clays, diamond particles, or a combination thereof, for example). In a further embodiment, the continuous fiber, discontinuous fiber, nanoparticle, microparticle, macroparticle, or combination thereof, is a primary filler and the coated nanomaterial is a secondary filler.

A number of existing materials use continuous fibers, such as carbon fibers, in a matrix. These fibers are much larger than carbon nanotubes. Adding coated nanomaterial to the matrix of a continuous fiber reinforced nanocomposite results in a multifunctional nanocomposite material having improved properties such as improved impact resistance, reduced thermal stress, reduced microcracking, reduced coefficient of thermal expansion, or increased transverse or through-thickness thermal conductivity. Resulting advantages of multifunctional nanocomposite structures include improved durability, improved dimensional stability, elimination of leakage in cryogenic fuel tanks or pressure vessels, improved through-thickness or in plane thermal conductivity, increased grounding or electromagnetic interference (EMI) shielding, increased flywheel energy storage, or tailored radio frequency signature (Stealth), for example. Improved thermal conductivity also could reduce infrared (IR) signature. Further existing materials that demonstrate improved properties by adding coated nanomaterial include metal particle nanocomposites for electrical or thermal conductivity, nano-clay nanocomposites, or diamond particle nanocomposites, for example.

In light of the foregoing, it will be appreciated that an article of manufacture comprising a polymer, a solution, a solid, a coated solid, or an insoluble solid containing a metal complex, a nanomaterial or a nanocomposite of the present invention as set forth herein can be produced. Such articles of manufacture include, but are not limited to, for example, epoxy and engineering plastic composites, filters, actuators, adhesive composites, elastomer composites, materials for thermal management (interface materials, spacecraft radiators, avionic enclosures and printed circuit board thermal planes, materials for heat transfer applications, such as coatings, for example), aircraft, ship infrastructure and automotive structures, improved dimensionally stable structures for spacecraft and sensors, reusable launch vehicle cryogenic fuel tanks and unlined pressure vessels, fuel lines, packaging of electronic, optoelectronic or microelectromechanical components or subsystems, rapid prototyping materials, fuel cells, medical materials, composite fibers, or improved flywheels for energy storage.

The following examples are presented to further illustrate various aspects of the present invention, and are not intended to limit the scope of the invention.

EXAMPLE 1

This example is used to illustrate how a silver complex is synthesized for use in coating nanomaterials.

Sodium dodecyl sulfate (SDS) (1.5 g, 5.0 mmol) was added by solid addition to an aqueous solution (1.0 mL) of silver nitrate (0.85 g, 5.0 mmol) and stirred at RT for 10 min. Chloroform (10 mL) was added to dissolve the silver(I) dodecyl sulfate. The solution was filtered to remove the $NaNO_3$. 4,4-bipyridine (0.78 g, 5.0 mmol) was added to the filtrate and stirred for 30 minutes to yield a viscous solution. The solvent was removed under reduced pressure to yield an off-white solid material that is ready for use as a compatibilizer. Thermal gravimetric analysis (TGA) of the compatibilizer demonstrated thermal stability with the loss of 4,4-bipyridine and dodecyl sulfate at ca. 220° C. The molecular composition was confirmed by $^1H$ and $^{13}C$ NMR and elemental analysis.

EXAMPLE 2

The following example is used to illustrate the treatment of MWNT with the silver complex.

The MWNT (Baytubes® C 150 P) used in this study were supplied by Bayer MaterialScience AG. It will be understood, however, that any nanomaterials, including other nanotubes, made by other methods/suppliers known to one of skilled in the art in light of the present disclosure may be used. They had a 95% purity, outer mean diameter of 13-16 nm and a length of 1-10 μm. The MWNT were used as received/without any purification.

Sonication was performed with the SONICATOR® 3000 supplied from Misonix, Inc. The sonicator was equipped with a ¾" horn and operated at a control setting of 6.5 (approximately 40 W).

An embodiment of the present invention comprises the formation of solutions of coated nanotubes, and solid compositions thereof. It is preferable to coat the carbon nanotubes with the silver complex in situ. For example, 2.0 g of carbon nanotubes were dispersed in 200 mL of chloroform by sonicating for 5 minutes. In a separate flask, silver nitrate (0.16 g) was dissolved in 0.5 mL of water and SDS (0.27 g) was added and mixed. Chloroform (20 mL) was added to dissolve the complex and this solution was added to the dispersed carbon nanotubes and sonicated for 5 additional minutes. 4,4-bypyridine (0.13 g) in chloroform (20 mL) was added to the carbon nanotubes/$AgNO_3$/SDS/chloroform solution and sonicated for an additional 5 minutes. Sonication is terminated and this solution is stable for weeks without settling out. The treated carbon nanotubes can be isolated by vacuum filtration to yield a black solid that weighs 2.48 g after drying at 70° C. for 10 h. The ratio (w/w) of the silver complex to carbon nanotubes is calculated as 0.24. This same ratio is obtained in further experiments where the addition of silver complex is in excess of the amount needed to produce a 0.24 weight ratio.

EXAMPLE 3

This example illustrates the dispersion of coated nanotubes.

The isolated coated nanotubes above can be re-dispersed in organic solvents by mixing the coated nanotubes in the solvent. For example, 3.0 mg of coated nanotubes are added to 1 mL of chloroform. The mixture was sonicated at room temperature for about 10 seconds. The resulting solutions are stable and do not settle, even after weeks.

EXAMPLE 4

This example is used to illustrate the formation of an epoxy/nanotube composite using treated nanotubes.

Dispersion of Treated Nanotubes into Epoxy Resin: Treated nanotubes can be dispersed into epoxy resins by addition of the treated nanotubes into either component of a two component epoxy resin system. Chloroform is added to the nanotube containing component in the amount needed to sufficiently lower the viscosity so that sonication is possible. The nanotube component is sonicated and the chloroform is removed under vacuum. An equal portion of the non-nanotube component is added and the mixture is mixed for 1 min using a propeller blade mixer. The mixture is poured into a mold and allowed to cure overnight to yield an epoxy/nanotube composite. Composite with varied loadings of treated nanotubes and untreated carbon nanotubes were prepared (1.0, 0.5, 0.1 and 0.01 wt % carbon nanotubes) and evaluated by microscope and it was determined that the treated nanotubes provided composite material with superior dispersion properties.

EXAMPLE 5

This example is used to illustrate the dispersion of treated nanotubes into a Nylon-12.

Coated nanotubes were dispersed in nylon-12 at 3 wt % and 6 wt % carbon nanotubes using the following procedure. Dry blends of coated carbon nanotubes (20 wt % coated with silver(I)-4,4-bipyridine dodecyl sulfate) and nylon 12 powder were prepared and vacuum dried for 16 h under reduced pressure at 70° C. Control batches were prepared using identical experimental conditions, however, uncoated carbon nanotubes were tested. All blends were then mixed for 2 minutes at 60 rpm at 190° C. using Volkume Brabender Mixer fitted with intermix type rotors. The resultant nanocomposites were cut into pieces, vacuum dried at 70-80° C./29 in Hg/16 h then compression molded into 4'×4'×0.036' plaques @180° C. Volume resistivity was measured across the thickness using ⅜" diameter electrodes coated with conductive silver paste. Ohm readings were taken with a Fluka model 16 digital multimeter. The volume resisitivity (Ohm-cm) recorded were 2.10E+06, 1.38E+03, 1.20E+08, and 1.13E-+08 for the resulting nanocomposites containing 3.0 wt % coated nanotubes, 6.0 wt % coated nanotubes, 3.0 wt % uncoated nanotubes and 6.0 wt % uncoated nanotubes respectively.

EXAMPLE 6

This example is used to illustrate the dispersion of treated nanomaterials, namely multi-walled carbon nanotubes, into an aqueous solvent.

Approximately 4.0 g of carbon nanotubes were sonicated in 200 mL of water for approximately 2 to 5 minutes. About 0.4 g of silver nitrate dissolved in about 10 mL of water was added to the carbon nanotubes and sonication was continued for about 2 to 5 minutes. 1-3 equiv (4-12 g) of sodium montmorillonite in 100 mL was added, and the solution was sonicated for another 5 minutes. The resultant product yielded a stable dispersion of silver silicate (montmorillonite)-coated nanotubes in water.

EXAMPLE 7

This example is used to illustrate another embodiment of the dispersion of treated nanomaterials into an aqueous solvent.

Approximately 4.0 g of carbon nanotubes were sonicated in 200 mL of water for approximately 2 to 5 minutes. About 0.4 g of copper nitrate dissolved in about 10 mL of water was added to the carbon nanotubes, and sonication was continued for about 2 to 5 minutes. 1-3 equiv (4-12 g) of sodium montmorillonite in 100 mL was added, and the solution was sonicated for another 5 minutes to yield a stable dispersion of copper silicate (montmorillonite)-coated nanotubes in water.

EXAMPLE 8

This example is used to illustrate the formation of a treatment of carbon nanomaterials (MWNT) in an aqueous solution.

The aqueous material obtained from Examples 6 and 7 were cast onto a glass substrate and dried overnight under ambient conditions. The resulting film showed no signs of cracking, excellent lubricity, and a surface resistivity of $2.4 \times 10^6$ ohm/sq.

An embodiment of the present invention include methods for incorporating treated nanomaterial into host polymer matrix. This includes, but are not limited to: (i) in-situ polymerization of monomer(s) of the host polymer the presence of coated nanomaterial; (ii) mixing both coated nanomaterial and host matrix in a solvent system; or (iii) mixing coated nanomaterial with a host polymer melt.

Other embodiments of the present invention will be apparent to those skilled in the art from a consideration of this specification or practice of the embodiments disclosed herein. However, the foregoing specification is considered merely exemplary of the present invention with the true scope and spirit of the invention being indicated by the following claims.

What is claimed is:

1. A metal complex dispersed on the surface of a nanomaterial and compatible with a matrix, the metal complex comprising: a metal cation adsorbed onto a surface of the nanomaterial; and a compatible surfactant anion compatible with a matrix, wherein the metal complex is devoid of any neutral donor ligands attached to the metal.

2. The metal complex of claim 1, wherein the metal cation is selected from the group consisting of transition metals from groups 4-12 of the transition series of the periodic table.

3. The metal complex of claim 2, wherein the metal cation is Ag.

4. The metal complex of claim 1, wherein the metal cation has a charge and wherein the surfactant anion is selected from the group consisting of any anionic species that would balance the charge on the metal cation.

5. The metal complex of claim 4, wherein the surfactant anion is a moiety selected from the group consisting of nitrate, triflate, sulfate, sulfonate, phosphate, and silicate.

6. The metal complex of claim 5, wherein the surfactant anion is a compatible surfactant anion and is selected from the group consisting of an inorganic mineral clay and a polyelectrolyte.

7. The metal complex of claim 6, wherein the inorganic mineral clay is a montmorillonite.

8. The metal complex of claim 5, wherein the surfactant anion is a compatible surfactant anion and is a sulfonate moiety.

9. The metal complex of claim 1, wherein the surfactant anion has a surfactant tail comprising from 1 to about 100 carbon atoms.

10. The metal complex of claim 9, wherein the surfactant tail contains a organic functional moiety selected from the group consisting of aromatic, alkyl, olefinic, allyl, ether, amide, carboxylic, carbonate, and combinations and mixtures thereof.

11. The metal complex of claim 1, where the surfactant anion is a monoanion, a oligomeric anion, or a polyanion.

12. The metal complex of claim 1, wherein the metal complex is used to compatibilize the nanomaterial into a matrix, and wherein the surfactant anion stabilizes any interactions between the metal complex and the matrix.

13. The metal complex of claim 1, wherein the metal complex is used in a coating that coats the entire surface of the nanomaterial.

14. The metal complex of claim 1, wherein the metal complex forms a non-covalent bond with the nanomaterial.

* * * * *